(12) United States Patent
Chalaki et al.

(10) Patent No.: US 12,494,130 B2
(45) Date of Patent: Dec. 9, 2025

(54) SYSTEMS AND METHODS FOR SWARM INVITATION BASED ON SOCIAL VALUES

(71) Applicant: Honda Motor Co., Ltd., Tokyo (JP)

(72) Inventors: Behdad Chalaki, Ann Arbor, MI (US); Vaishnav Tadiparthi, Ann Arbor, MI (US); Hossein Nourkhiz Mahjoub, Ann Arbor, MI (US); Ehsan Moradi Pari, Ann Arbor, MI (US); Jovin Jeevan D'Sa, Ann Arbor, MI (US)

(73) Assignee: Honda Motor Co., Ltd., Tokyo (JP)

( * ) Notice: Subject to any disclaimer, the term of this patent is extended or adjusted under 35 U.S.C. 154(b) by 115 days.

(21) Appl. No.: 18/477,880

(22) Filed: Sep. 29, 2023

(65) Prior Publication Data
US 2025/0111783 A1  Apr. 3, 2025

(51) Int. Cl.
G08G 1/00 (2006.01)
B60W 30/165 (2020.01)
H04W 4/46 (2018.01)

(52) U.S. Cl.
CPC ............. *G08G 1/22* (2013.01); *B60W 30/165* (2013.01); *H04W 4/46* (2018.02);
(Continued)

(58) Field of Classification Search
CPC ............... G08G 1/22; G08G 1/096725; G08G 1/096791; G08G 1/075; G08G 1/096783;
(Continued)

(56) References Cited

U.S. PATENT DOCUMENTS 9,884,625 B2  2/2018  Taira et al.
10,860,025 B2  12/2020  Cunningham
(Continued)

FOREIGN PATENT DOCUMENTS

CN  106991846 B  4/2020
CN  111845754 B  9/2021
(Continued)

OTHER PUBLICATIONS

Gergely Hollósi, Csaba Lukovszki, Máté Bancsics, and Gabor Magyar. "Traffic Swarm Behaviour: Machine Learning and Game Theory in Behaviour Analysis," Infocommunications journal. 13. 19-27. (Jan. 2021) DOI: 10.36244/ICJ.2021.4.3.
(Continued)

*Primary Examiner* — Ashley L Redhead, Jr.
(74) *Attorney, Agent, or Firm* — Rankin, Hill & Clark LLP (57) ABSTRACT

Systems and methods for swarm invitation based on social values are provided. In one embodiment, a method includes calculating a total disruption value of a proximate vehicle on a roadway with a plurality of swarm vehicles of a swarm on the roadway. The total disruption value of the proximate vehicle is based on a velocity disruption value of the proximate vehicle and a position disruption value of the proximate vehicle. The method also includes determining a proximate social alignment value of the proximate vehicle based on a comparison of the total disruption value to a threshold disruption value. The threshold disruption value is based on a desired social alignment value of the swarm. The method yet further includes sending a swarm request to the proximate vehicle when the proximate social alignment value corresponding to the desired social alignment value.

20 Claims, 5 Drawing Sheets

(52) U.S. Cl.
CPC ............... *B60W 2554/4041* (2020.02); *B60W 2554/4044* (2020.02); *B60W 2554/4045* (2020.02); *B60W 2554/80* (2020.02); *B60W 2556/65* (2020.02)

(58) Field of Classification Search
CPC ............... G08G 1/167; B60W 30/165; B60W 2554/4041; B60W 2554/4044; B60W 2554/4045; B60W 2554/80; B60W 2556/65; B60W 40/04; B60W 30/18154; B60W 30/18163; B60W 2554/408; B60W 2554/4042; H04W 4/46; G06Q 50/43; G05D 1/0289
See application file for complete search history.

(56) References Cited

U.S. PATENT DOCUMENTS

| | | | |
|---|---|---|---|
| 10,902,726 | B2 | 1/2021 | Alvarez et al. |
| 11,077,850 | B2 | 8/2021 | Green et al. |
| 11,221,229 | B1* | 1/2022 | Mclean ................ G05D 1/0088 |
| 11,313,693 | B2 | 4/2022 | MacDonald et al. |
| 11,407,415 | B2 | 8/2022 | Austin et al. |
| 11,462,111 | B2 | 10/2022 | Vassilovski et al. |
| 2014/0129075 | A1 | 5/2014 | Carleton |
| 2019/0329778 | A1 | 10/2019 | D'sa et al. |
| 2019/0373419 | A1* | 12/2019 | Bayley ...................... G08G 1/22 |
| 2020/0175880 | A1* | 6/2020 | Ibrahim ............... G08G 1/0129 |
| 2020/0312155 | A1* | 10/2020 | Kelkar ................. B60W 60/005 |
| 2021/0056852 | A1* | 2/2021 | Lund ...................... G08G 1/005 |
| 2021/0086784 | A1 | 3/2021 | Stewart et al. |
| 2021/0146964 | A1 | 5/2021 | Rus et al. |
| 2022/0386094 | A1* | 12/2022 | Vemuri .................... H04W 4/70 |
| 2023/0010974 | A1* | 1/2023 | Cho ...................... G05D 1/0295 |
| 2023/0101576 | A1* | 3/2023 | Kumar ................ H04W 12/104 455/456.1 |
| 2023/0182764 | A1 | 6/2023 | Fukui et al. |
| 2023/0188508 | A1* | 6/2023 | Stählin ............. G08G 1/096791 380/239 |
| 2025/0078662 | A1* | 3/2025 | Ansari ...................... G08G 1/22 |

FOREIGN PATENT DOCUMENTS

| | | |
|---|---|---|
| CN | 113788029 A | 12/2021 |
| JP | 6570507 B2 | 9/2019 |
| JP | 6865979 B2 | 4/2021 |
| WO | WO2022030372 A1 | 2/2022 |

OTHER PUBLICATIONS

Wilko Schwarting, Alyssa Pierson, Javier Alonso-Mora, Sertac Karaman, and Daniela Rus. Social behavior for autonomous vehicles. Proceedings of the National Academy of Sciences, 116(50):24972-24978, 2019.

Wim BG Liebrand and Charles G McClintock. The ring measure of social values: A computerized procedure for assessing individual differences in information processing and social value orientation. European journal of personality, 2(3):217-230, 1988.

Office Action of U.S. Appl. No. 18/477,897 dated Sep. 22, 2025, 20 pages.

* cited by examiner

SYSTEMS AND METHODS FOR SWARM INVITATION BASED ON SOCIAL VALUES

RELATED APPLICATIONS

This application is related to U.S. Non-Provisional application entitled SYSTEMS AND METHODS FOR SWARM ADAPTATION BASED ON SOCIAL VALUE ORIENTATIONS, U.S. patent application Ser. No. 14/424,883, filed concurrently herewith, which is expressly incorporated by reference.

BACKGROUND

Interacting with human drivers is one of the great challenges of autonomous driving. To operate in the real world, autonomous vehicles need to cope with situations requiring complex observations and interactions, such as highway merging and unprotected left-hand turns, which are challenging even for human drivers. To add to this challenge, both autonomous and non-autonomous vehicles may act on a behavior spectrum from altruistic behavior to egotistical behavior. Altruistic driving may create bottlenecks in traffic flow, especially at intersections, for example, waiting to allow other vehicles to move through the intersection. Conversely, an autonomous vehicle designed to exhibit more egotistical behavior, for example, making decisions based solely on the best interest of the egotistical vehicle (i.e., without making decisions that may benefit other road users) can negatively affect the overall flow of traffic on the road.

BRIEF DESCRIPTION

In one embodiment, a system for swarm invitation based on social values is provided. The system may include a processor and a memory storing instructions. When executed by the processor, the instructions cause the processor to calculate a total disruption value of a proximate vehicle on a roadway with a plurality of swarm vehicles of a swarm on the roadway. The proximate vehicle and the swarm vehicles of the swarm are roadway vehicles traveling in the same longitudinal direction on the roadway. The total disruption value of the proximate vehicle is based on a velocity disruption value of the proximate vehicle and a position disruption value of the proximate vehicle. The instructions also cause the processor to determine a proximate social alignment value of the proximate vehicle based on a comparison of the total disruption value to a threshold disruption value. The threshold disruption value is based on a desired social alignment value of the swarm. The instructions further cause the processor to send a swarm request to the proximate vehicle when the proximate social alignment value corresponds to the desired social alignment value.

According to another aspect, a computer-implemented method for swarm invitation based on social values is provided. The computer-implemented method includes calculating a total disruption value of a proximate vehicle on a roadway with a plurality of swarm vehicles of a swarm on the roadway. The proximate vehicle and the swarm vehicles of the swarm are roadway vehicles traveling in the same longitudinal direction on the roadway. The total disruption value of the proximate vehicle is based on a velocity disruption value of the proximate vehicle and a position disruption value of the proximate vehicle. The computer-implemented method also includes determining a proximate social alignment value of the proximate vehicle based on a comparison of the total disruption value to a threshold disruption value. The threshold disruption value is based on a desired social alignment value of the swarm. The computer-implemented method further includes sending a swarm request to the proximate vehicle when the proximate social alignment value corresponding to the desired social alignment value.

According to another aspect, a computer-implemented method for swarm invitation based on social values is provided. The computer-implemented method includes calculating a total disruption value of a proximate vehicle on a roadway with a plurality of swarm vehicles of a swarm on the roadway. The proximate vehicle and the swarm vehicles of the swarm are roadway vehicles traveling in the same longitudinal direction on the roadway. The total disruption value of the proximate vehicle is based on a velocity disruption value of the proximate vehicle and a position disruption value of the proximate vehicle. The computer-implemented method also includes determining a proximate social alignment value of the proximate vehicle based on a comparison of the total disruption value to a threshold disruption value. The threshold disruption value is based on a desired social alignment value of the swarm. The computer-implemented method further includes sending a swarm request to the proximate vehicle when the proximate social alignment value corresponding to the desired social alignment value.

DETAILED DESCRIPTION

Roadway vehicles may exhibit some level of autonomy, such that, to some degree, the roadway vehicles may be controlled without intervention from a vehicle occupant. The roadway vehicles may control themselves according to a goal and/or may control each other to execute actions on a roadway. The roadway vehicles may include swarm vehicles of a swarm that act collectively based on an instantaneous traffic scenario and a shared goal of the swarm. The roadway vehicles may also include proximate vehicles that have individual goals. Therefore, while the proximate vehicle may act autonomously to achieve an individual goal specific to that proximate vehicle, the swarm vehicles act autonomously to achieve a shared goal of the swarm. However, the effectiveness of the swarm may be increased when one or more proximate vehicles join the swarm. For example, if a swarm vehicle wants to change lanes to a target lane, the swarm may benefit from adding proximate vehicles already in the target lane to the swarm so that the newly added vehicles can assist the swarm vehicle in changing lanes (i.e., adjust or maintain speed to allow the swarm vehicle to enter the target lane).

The systems and methods described herein analyze the actions of the proximate vehicles to determine social values of the proximate vehicles. The social values are defined by a social alignment value. For example, the behavior of the proximate vehicles may be analyzed to allocate the behavior of the proximate vehicles as having social values that are either egotistic or altruistic. An egotistic vehicle may act in ways that only advance the goals of that egotistic vehicle. For example, if the goal of the egotistic vehicle is to reach a destination in the shortest amount of time possible, the egotistic vehicle may not slow down to allow another vehicle to merge. An altruistic vehicle may act to benefit traffic as a whole. For example, an altruistic vehicle would allow another vehicle to merge or pass even if that action required the altruistic vehicle to add a small amount of time to reach its intended destination.

The behavior of the proximate vehicles is classified to determine whether the proximate vehicles exhibit the desired social alignment value of the swarm. For example, the swarm may desire an altruistic social alignment value to facilitate the maneuvers of the swarm. Continuing the example from above, the swarm may have a desired social alignment value of altruistic, so that if the proximate vehicle is included in the swarm, that proximate vehicle may slow down to allow the swarm vehicle to change lanes to the target lane. Thus, if a proximate vehicle exhibits the desired social alignment value, an invitation may be sent to the proximate value to invite the proximate vehicle to join the swarm as a swarm vehicle. Moreover, if multiple proximate vehicles are potential candidates to invite to join the swarm, the swarm may select one proximate vehicle from the multiple proximate vehicles, wherein the one selected proximate vehicle exhibits the most altruistic behavior relative to the multiple proximate vehicles. Conversely, a generally altruistic swarm will not invite a proximate vehicle exhibiting egotistic behavior as that proximate vehicle is less likely to agree to join the swarm and/or be satisfied as a part of an altruistic swarm. Accordingly, the systems and methods described herein improve efficacy of the swarm by inviting proximate vehicles to the swarm based on the social values of the proximate vehicle.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Agent" as used herein is a self-propelled machine that moves through or manipulates an environment. Exemplary agents may include, but is not limited to, robots, vehicles, or other self-propelled machines. The agent may be autonomously or semi-autonomously operated.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a bus that interconnects components inside an agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, computing device, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein may include input and/or output devices for receiving input and/or devices for outputting data. The input and/or output may be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms.

A "vehicle", as used herein, refers to any moving vehicle that is capable of carrying one or more human occupants and is powered by any form of energy. The term "vehicle" includes cars, trucks, vans, minivans, SUVs, motorcycles, scooters, boats, personal watercraft, and aircraft. In some scenarios, a motor vehicle includes one or more engines. Further, the term "vehicle" may refer to an electric vehicle (EV) that is powered entirely or partially by one or more electric motors powered by an electric battery. The EV may include battery electric vehicles (BEV) and plug-in hybrid electric vehicles (PHEV). Additionally, the term "vehicle" may refer to an autonomous vehicle and/or self-driving vehicle powered by any form of energy. The autonomous vehicle may or may not carry one or more human occupants.

"Vehicle display," as used herein may include, but is not limited to, LED display panels, LCD display panels, CRT display, plasma display panels, touch screen displays, among others, that are often found in vehicles to display information about the vehicle. The display may receive input (e.g., touch input, keyboard input, input from various other input devices, etc.) from a user. The display may be located in various locations of the vehicle, for example, on the dashboard or center console. In some embodiments, the display is part of a portable device (e.g., in possession or associated with a vehicle occupant), a navigation system, an infotainment system, among others.

"Vehicle occupant," as used herein may include, but is not limited to, one or more biological beings located in the vehicle. The vehicle occupant may be a driver or a passenger of the vehicle. The vehicle occupant may be a human (e.g., an adult, a child, an infant) or an animal (e.g., a pet, a dog, a cat).

A "vehicle system", as used herein, may be any automatic or manual systems that may be used to enhance vehicle operation, driving, and/or operation. Exemplary vehicle systems include an autonomous driving system, an electronic stability control system, an anti-lock brake system, a brake assist system, an automatic brake prefill system, a low speed follow system, a cruise control system, a warning system, a braking system, an auto cruise control system, a lane departure warning system, a blind spot indicator system, a lane keep assist system, a navigation system, a transmission system, brake pedal systems, an electronic power steering system, visual devices (e.g., camera and imaging systems), a climate control system, an electronic pretensioning system, a monitoring system, a passenger detection system, a vehicle suspension system, a vehicle seat configuration system, a vehicle cabin lighting system, an audio system, a sensory system, among others.

I. System Overview

Figure 1A:
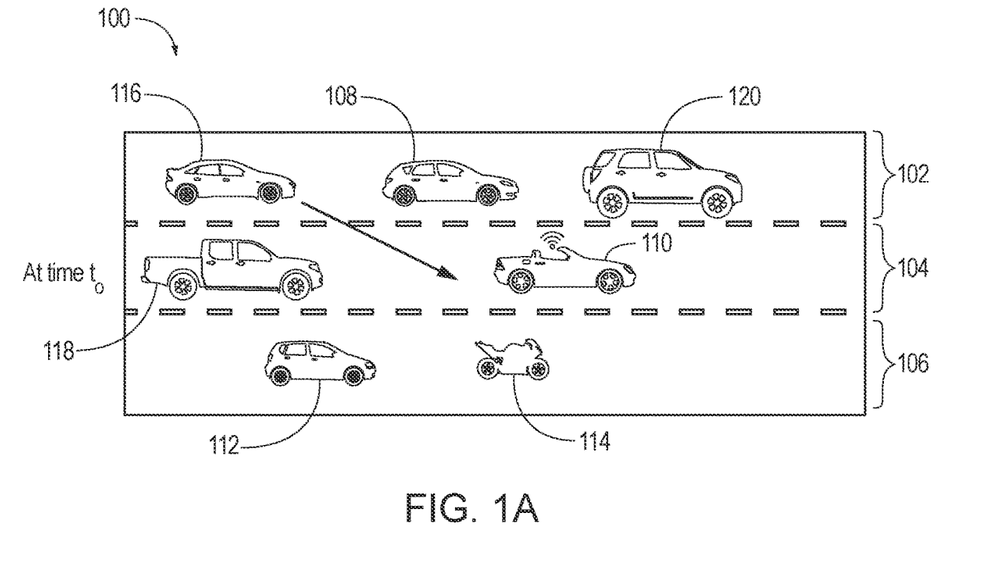
FIG. 1A is a schematic diagram of an exemplary traffic scenario on a roadway at a first time, according to one embodiment.
Figure 1B:
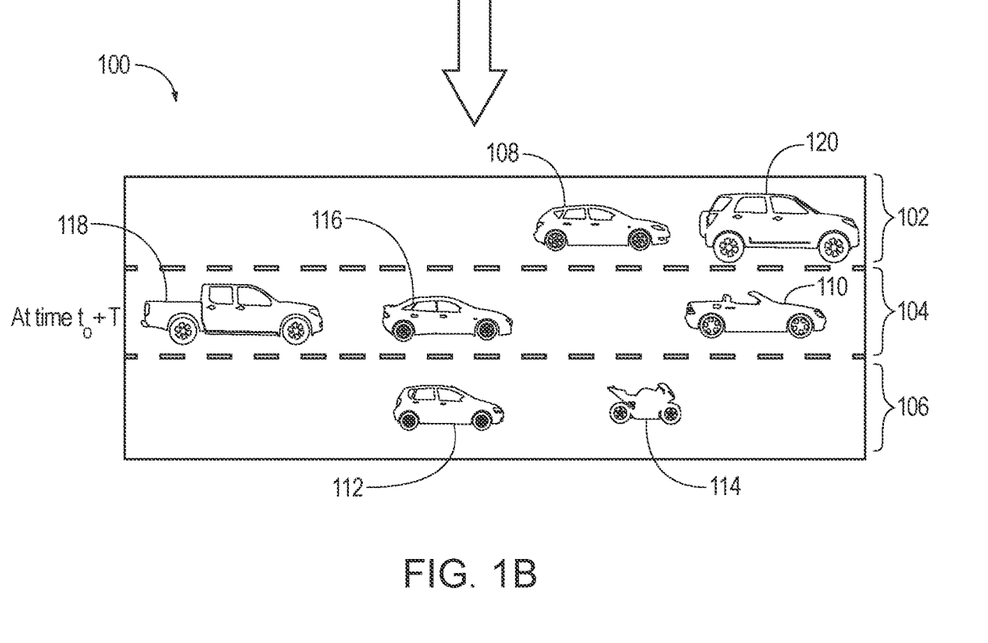
FIG. 1B is a schematic diagram of an exemplary traffic scenario on a roadway at a second time, later than the first time, according to one embodiment.

FIGS. 1A and 1B are exemplary traffic scenario on a roadway 100 that will be used to describe swarm invitation based on social values according to one embodiment. The roadway 100 may be any type of road, highway, freeway, or travel route. In FIGS. 1A and 1B, the roadway 100 includes a first lane 102, a second lane 104, and a third lane 106 with vehicles traveling in the same longitudinal direction, however, the roadway 100 may have various configurations not shown and may have any number of lanes.

The roadway 100 includes a plurality of roadway vehicles. The plurality of roadway vehicles may be classified based on their membership in the swarm and/or autonomy capability. FIG. 1A is a snapshot of the roadway 100 at a first time and FIG. 1B is a snapshot of the roadway 100 at a second time that is later than the first time. The classification of one or more roadway vehicles as swarm vehicles may change in time based on their current relationship with the swarm.

In FIG. 1A, a swarm includes swarm vehicles 108, 110, 112, 114, and 116. The swarm vehicles 108-116 exhibit some level of autonomy, such as parking assist or adaptive cruise control, and are able to engage in computer communication with other vehicles. One or more of the swarm vehicles 108-116 may be a host vehicle 200, shown in greater detail in FIG. 2. The host vehicle 200 accesses an operating environment 300, either directly or remotely, to a vehicle computing device (VCD) 302 that will be described in further detail with respect to FIG. 3. The swarm vehicles 108-116 may have the same or varying levels of autonomy. The levels of autonomy describe a swarm vehicle's ability to sense its surroundings and navigate trajectories without human intervention. In some embodiments, the levels may be defined by specific features or capabilities that a swarm vehicle may have, such as a swarm vehicle's ability to plan a path. The proximate vehicles 118 and 120 are also traveling the roadway at the first time in the same longitudinal direction as the swarm vehicles 108-116. Like the swarm vehicles 108-116, the proximate vehicles may exhibit some level of autonomy.

Figure 2:
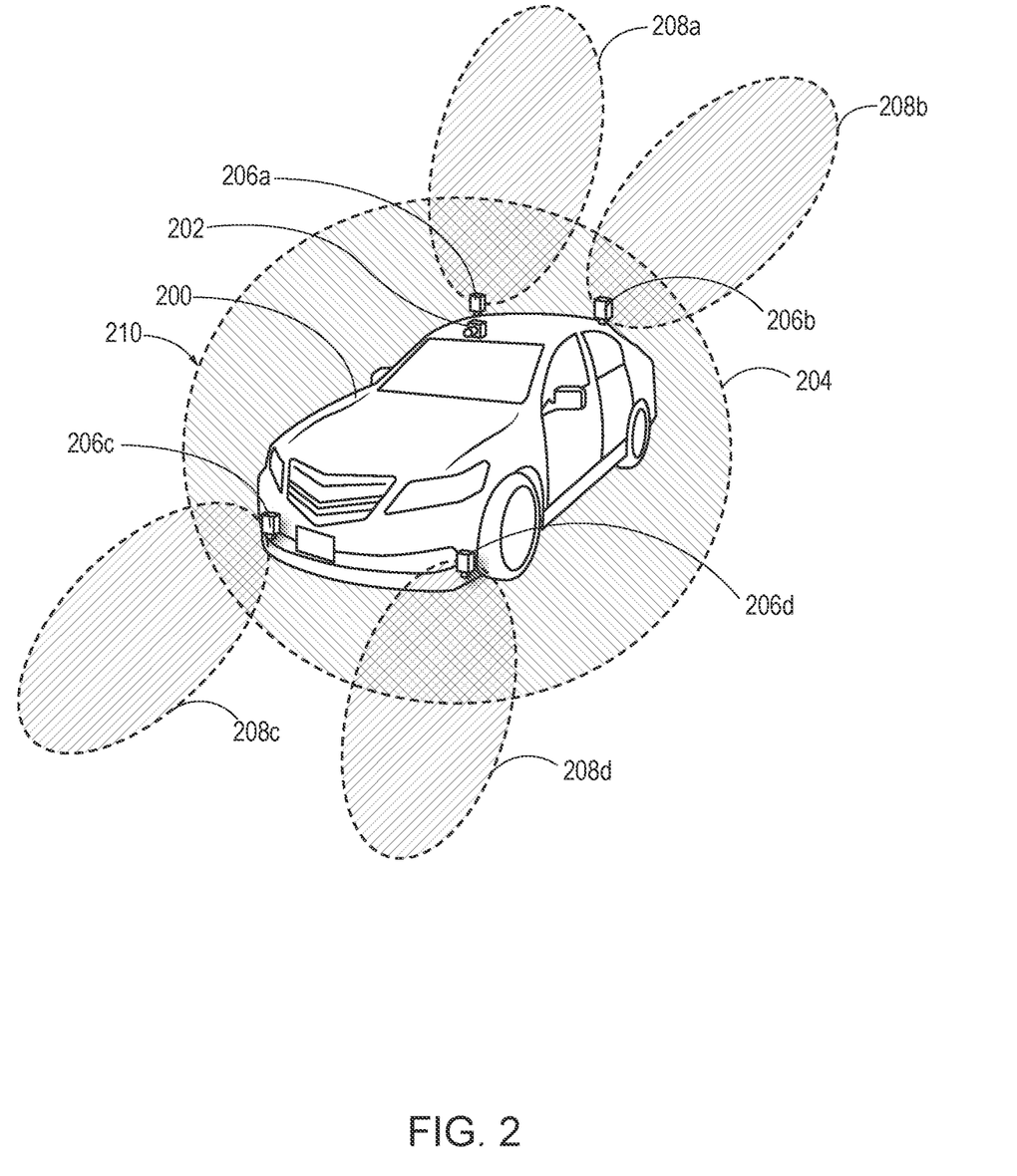
FIG. 2 is a schematic view of an exemplary sensor map of a host vehicle, according to one embodiment.

The swarm vehicles 108-116 may include at least one sensor for sensing objects and the surrounding environment of the roadway 100, as shown with respect to the host vehicle 200 of FIG. 2. The host vehicle 200 may represent an individual swarm vehicle of the swarm, a potential member of the swarm, or be centralized for the swarm as a whole. Accordingly, any or all of the swarm vehicles 108-116 is able to act as the host vehicle 200. The surrounding environment may be defined as a predetermined area located around (e.g., ahead, to the side of, behind, above, below) a host vehicle 200.

Turning to FIG. 2, the at least one sensor may include a light sensor 202 for capturing sensor data in a light sensing area 204 and one or more image sensors 206a, 206b, 206c, and 206d for capturing sensor data in corresponding image sensing areas 208a, 208b, 208c, and 208d which collectively form a sensor map 210. The sensor map 210 shown in FIG. 2 is based on one configuration of sensors including the light sensor 202 and the one or more image sensors 206a, 206b, 206c, and 206d. However, the sensor map 210 may have various configurations not shown in FIG. 2 based on the presence, position, acuity, etc. of the vehicle sensors of the host vehicle 200. Furthermore, the sensor data may additionally be received from remote sources. For example, the swarm vehicle 108 may receive sensor data from the swarm vehicle 110. Accordingly, the swarm vehicles 108-116 send and receive sensor data.

The light sensor 202 may be used to capture light data in the light sensing area 204. The size of the light sensing area 204 may be defined by the location, range, sensitivity, and/or actuation of the light sensor 202. For example, the light sensor 202 may rotate 360 degrees around the host vehicle 200 and collect sensor data from the light sensing area 204 in sweeps. Conversely, the light sensor 202 may be omnidirectional and collect sensor data from all directions of the light sensing area 204 simultaneously. For example, the light sensor 202 may emit one or more laser beams of ultraviolet, visible, or near infrared light in the light sensing area 204 to collect sensor data.

The light sensor 202 may be configured to receive one or more reflected laser waves (e.g., signals) that are reflected off one or more objects in the light sensing area 204. In other words, upon transmitting the one or more laser through the light sensing area 204, the one or more laser beams may be reflected as laser waves by one or more traffic related objects (e.g., vehicles, pedestrians, trees, guardrails, etc.) that are located within the light sensing area 204.

The one or more image sensors 206a, 206b, 206c, and 206d may also be positioned around the host vehicle 200 to capture additional sensor data from the corresponding image sensing areas 208a, 208b, 208c, and 208d. The size of the image sensing areas 208a-208d may be defined by the location, range, sensitivity and/or actuation of the one or more image sensors 206a-206d.

The one or more image sensors 206a-206d may be disposed at external front and/or side portions of the host vehicle 200, including, but not limited to different portions of the vehicle bumper, vehicle front lighting units, vehicle fenders, and the windshield. The one or more image sensors 206a-206d may be positioned on a planar sweep pedestal (not shown) that allows the one or more image sensors 206a-206d to capture images of the external environment of the host vehicle 200 at various angles. Additionally, the one or more image sensors 206a-206d may be disposed at internal portions of the host vehicle 200 including the vehicle dashboard (e.g., dash mounted camera), rear side of a vehicle rear view mirror, etc.

Figure 3:
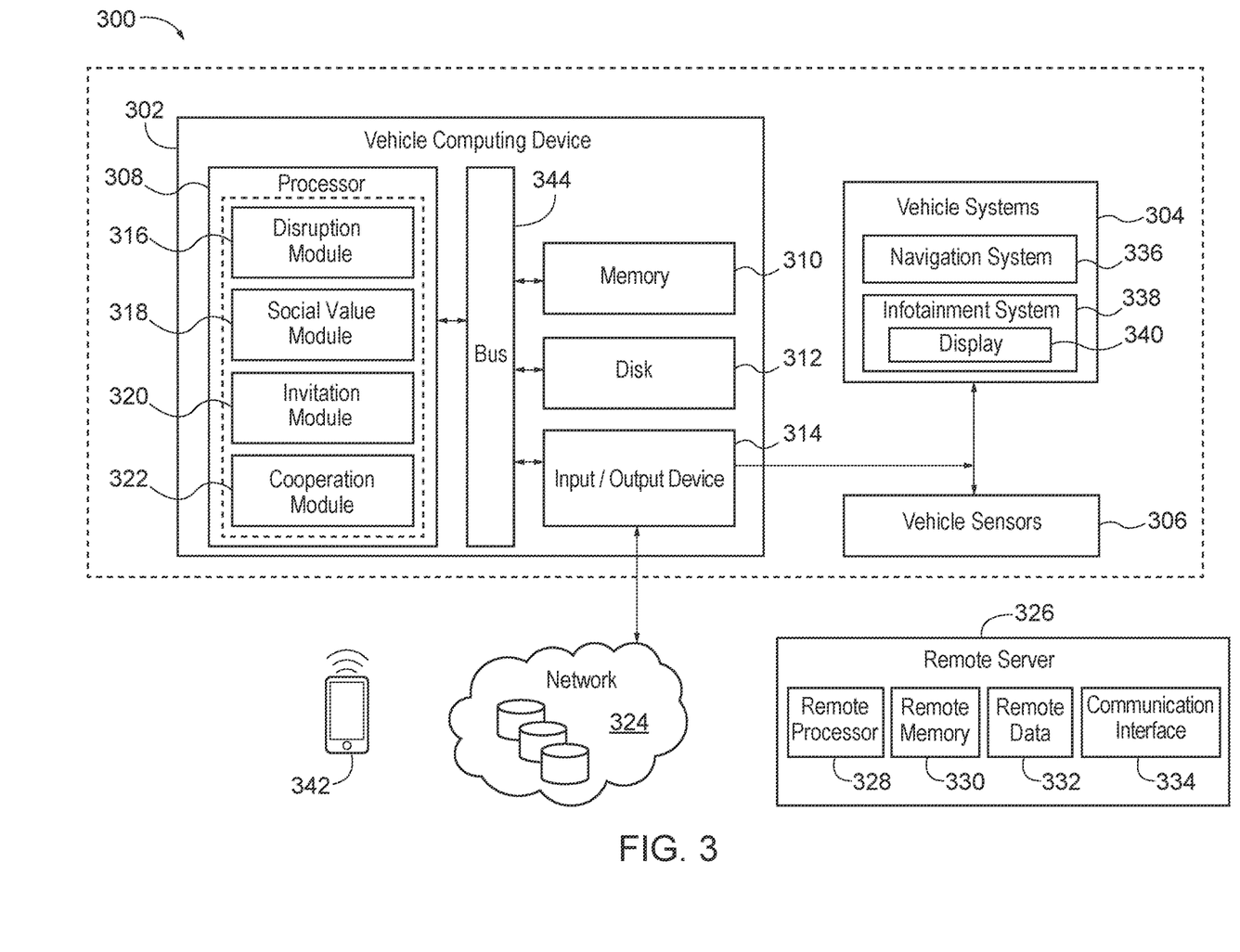
FIG. 3 is a block diagram of an operating environment for swarm invitation based on social values, according to an exemplary embodiment.

FIG. 3 is a block diagram of the operating environment 300 for implementing swarm invitation based on social values according to an exemplary embodiment. For clarity, the operating environment 300 will be described with respect to the host vehicle 200 which may represent an individual swarm vehicle of the swarm, a potential member of the swarm or be centralized for the swarm as a whole. Accordingly, as discussed above, any or all of the swarm vehicles 108-116 is able to act as the host vehicle 200 with respect to the operating environment 300 shown in FIG. 3.

In FIG. 3, the host vehicle 200 includes the VCD 302, vehicle systems 304, and vehicle sensors 306. Generally, the VCD 302 includes a processor 308, a memory 310, a disk 312, and an input/output (I/O) device 314, which are each operably connected for computer communication via a bus 344 and/or other wired and wireless technologies defined herein. The VCD 302 includes provisions for processing, communicating, and interacting with various components of the host vehicle 200. In one embodiment, the VCD 302 may be implemented with the host vehicle 200, for example, as part of a telematics unit, a head unit, an infotainment unit, an electronic control unit, an on-board unit, or as part of a specific vehicle control system, among others. In other embodiments, the VCD 302 may be implemented remotely from the host vehicle 200, for example, with a remote transceiver (not shown), a portable device 342, or a remote server 326 connected via the network 324.

The processor 308 may include logic circuitry with hardware, firmware, and software architecture frameworks for facilitating swarm control of the host vehicle 200. The processor 308 may store application frameworks, kernels, libraries, drivers, application program interfaces, among others, to execute and control hardware and functions discussed herein. For example, the processor 308 may include a disruption module 316, a social value module 318, an invitation module 320, and a cooperation module 322, although the processor 308 may be configured into other architectures. Further, in some embodiments, the memory 310 and/or the disk 312 may store similar components for execution by the processor 308.

The I/O device 314 may include software and hardware to facilitate data input and output between the components of the VCD 302 and other components of the operating environment 300. Specifically, the I/O device 314 may include network interface controllers (not shown) and other hardware and software that manages and/or monitors connections and controls bi-directional data transfer between the I/O device 314 and other components of the operating environment 300 using, for example, the network 324.

In some embodiments, cooperating vehicles may communicate via a transceiver (not shown). The transceiver may be a radio frequency (RF) transceiver may be used to receive and transmit information to and from a remote server. In some embodiments, the VCD 302 may receive and transmit information to and from the remote server 326 as remote data 332 including, but not limited to, vehicle data, traffic data, road data, curb data, vehicle location and heading data, high-traffic event schedules, weather data, or other transport related data. In some embodiments, the remote server 326 may be linked to multiple roadway vehicles 108-120, other entities, traffic infrastructures, and/or devices through a network connection, such as via the wireless network antenna, the roadside equipment, and/or other network connections.

Referring again to the host vehicle 200, the vehicle systems 304 may include any type of vehicle control system described herein to enhance the host vehicle 200 and/or driving of the host vehicle 200. For example, the vehicle systems 304 may include autonomous driving systems, driver-assist systems, adaptive cruise control systems, lane departure warning systems, merge assist systems, freeway merging, exiting, and lane-change systems, warning systems, and automatic guided vehicle systems, or any other advanced driving assistance systems (ADAS). Here, the vehicle systems 304 include a navigation system 336 and an infotainment system 338. The navigation system 336 may store, calculate, and provides route and destination information and facilitate features like turn-by-turn directions. The infotainment system 338 provides visual information and/or entertainment to the vehicle occupant and may include a display 340.

The vehicle sensors 306, which may be implemented with the vehicle systems 304, may include various types of sensors for use with the host vehicle 200 and/or the vehicle systems 304 for detecting and/or sensing a parameter of the host vehicle 200, the vehicle systems 304, and/or the environment surrounding the host vehicle 200. For example, the vehicle sensors 306 may provide data about vehicles and/or downstream objects in proximity to the host vehicle 200. For example, the vehicle sensors 306 may include, but are not limited to: acceleration sensors, speed sensors, braking sensors, proximity sensors, vision sensors, ranging sensors, seat sensors, seat-belt sensors, door sensors, environmental sensors, yaw rate sensors, steering sensors, GPS sensors, among others. The vehicle sensors 306 may be any type of sensor, for example, acoustic, electric, environmental, optical, imaging, light, pressure, force, thermal, temperature, proximity, among others.

Using the system and network configuration discussed above, the swarm vehicles 108-116 may adapt their actions based on the social values of proximate vehicle 118, 120 also traveling the roadway 100. Detailed embodiments describing exemplary methods using the system and network configuration discussed above, will now be discussed in detail.

II. Methods for Swarm Invitation Based on Social Values

Figure 4:
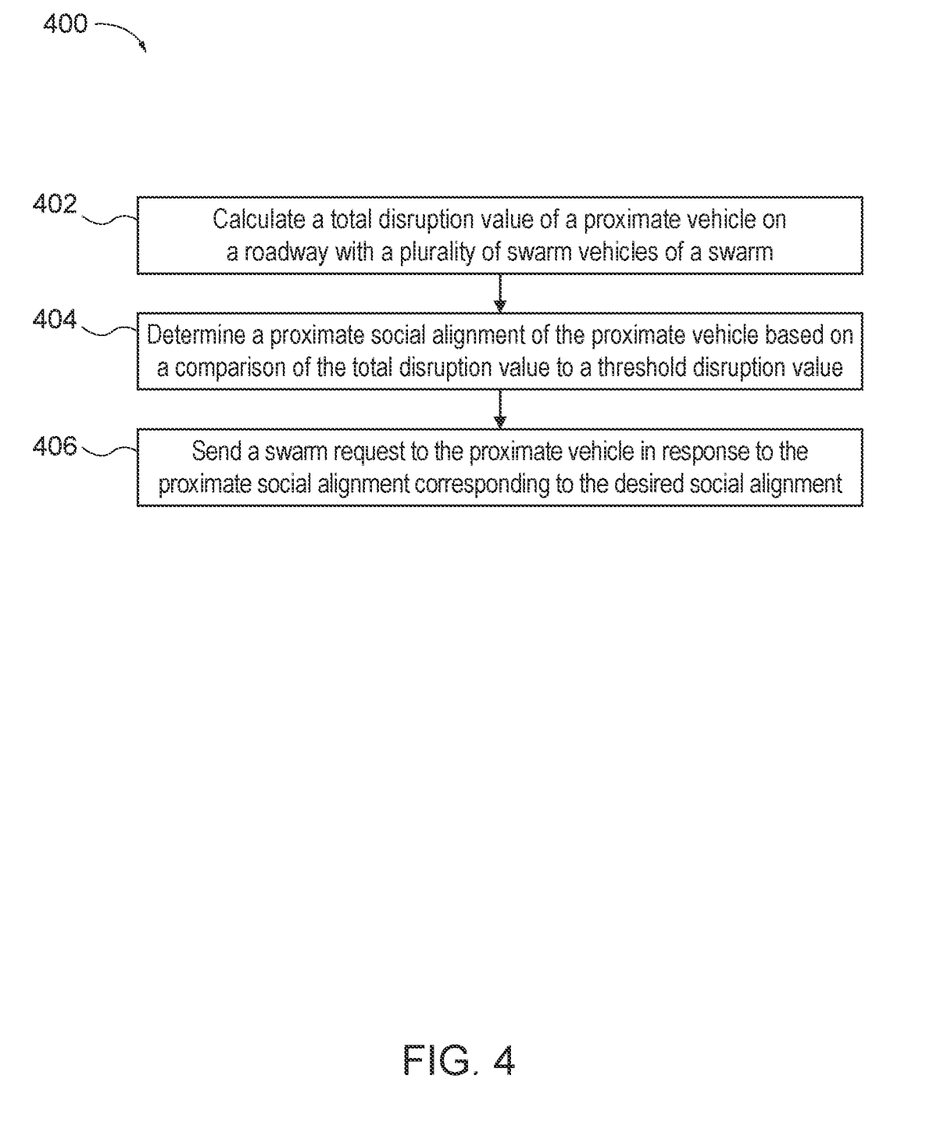
FIG. 4 is an exemplary process flow for swarm invitation based on social values, according to one aspect.

Referring now to FIG. 4, a method 400 for swarm invitation based on social values will now be described according to an exemplary embodiment. FIG. 4 will also be described with reference to FIGS. 1-3 and 5. For simplicity, the method 400 will be described as a sequence of blocks, but it is understood that the elements of the method 400 may be organized into different architectures, elements, stages, and/or processes.

At block 402, the method 400 includes the disruption module 316 calculating a total disruption value of a proximate vehicle, such as the proximate vehicle 118, on a roadway 100 with a plurality of swarm vehicles 108-116 of a swarm. The proximate vehicles 118, 120 and the swarm vehicles 108-116 of the swarm are roadway vehicles 108-120 traveling in the same longitudinal direction on the roadway 100. As described above, the swarm vehicles 108-116 may collectively act to achieve a shared goal. For example, the swarm vehicles 108-116 may collectively act to allow the swarm vehicle 116 to change lanes from the first lane 102 to the second lane 104. The cooperation module 322 may identify proximate vehicles 118, 120 of a plurality of proximate vehicles that are traveling the roadway 100. Based on the shared goal, the cooperation module 322 may target one or more proximate vehicles 118, 120 that may affect the shared goal. For example, if the swarm vehicle 116 moves to the second lane 104 to the area indicated by the arrow, then the proximate vehicle 118 will be a following vehicle that affects the size of the gap in the second lane 104 that the swarm vehicle 116 is attempting to occupy. Therefore, the proximate vehicle 118 may affect the shared goal of the swarm by preventing or allowing the swarm vehicle 116 to change lanes from the first lane 102 to the second lane 104. Likewise, the proximate vehicle 120 may affect the shared goal of the swarm by limiting the speed of the swarm vehicle 116 and the proximate 108. Thus, the cooperation module 122 may specify one or more proximate vehicle 118, 120 of the plurality of proximate vehicles that directly affect the shared goal of the swarm. As another example (not shown), the swarm vehicle 116 may attempt to move from the slower lane, for example the second lane 104, to a faster lane, for example, the first lane 102. Again, the cooperation module 322 may identify proximate vehicles that may affect the shared goal, such as the proximate vehicles 108 and 120.

In another embodiment, a total disruption value may be calculated for each of the proximate vehicles 118, 120 that is within a proximity threshold of any of the swarm vehicle 108-116. The proximity threshold may be given by $|x_H(t)-x_i(t)| \leq r_S$ for any $i \in S(t)$, where S is the set of swarm vehicles 108-116, H is a proximate vehicle, such as the proximate vehicle 118, that is within sensor range one swarm vehicle, denoted as i, of the set of swarm vehicles 108-116. The position and velocity of a swarm vehicle, at a time t is given by $x_i(t)$ and $v_i(t)$, respectively. The proximity threshold, $r_S$, may be predetermined or dynamic. The proximity threshold, $r_S$, may be based on one or more of the configurations of the roadway 100, the number of swarm vehicles 108-116, the shared goal of the swarm, etc.

For clarity, calculating the total disruption value will be described with respect to the proximate vehicle 118. The total disruption value, $D_H(t)$, of the proximate vehicle 118 is based one a velocity disruption value, $d_{v_H}$, of the proximate vehicle 118 and a position disruption value, $d_{x_H}$, of the proximate vehicle 118. The velocity disruption value, $d_{v_H}(t)$, is based on a velocity differential between a proximate vehicle velocity, $v_H(t)$, and the average traffic velocity $v_{avg}(t)$ that is an average velocity of the roadway vehicles. Accordingly, the velocity disruption value, $d_{v_H}(t)$ may be given as:

$$d_{v_H}(t) = (v_H(t) - v_{avg}(t))^2$$

The position disruption value, $d_{x_H}$, of the proximate vehicle 118 is based on a position differential of the proximate vehicle 118 from a first time, to, shown in FIG. 1A, to a second time, $t_1$, shown in FIG. 1B, in a first iteration, such that $t_0+T=t_1$. The position differential is based on an observed position of the proximate vehicle 118 at the second time, $t_1$, relative to an expected position of the proximate vehicle 118 at the second time, $t_1$, in a predicted trajectory based on a flow velocity, $v_{flow}(t)$, of the roadway vehicles, and be given by:

$$d_{x_H}(t_1) = (x_H(t_1) - (x_H(t_0) + v_{flow}(t_0)(t_1 - t_0)))^2$$

The flow velocity, $v_{flow}(t)$, may be defined as a convex combination of the average speed of the swarm vehicles 108-116. The flow velocity, $v_{flow}(t)$, may further be based on a maximum allowable speed, $v_{max}$, of the roadway 100, and be given by:

$$v_{flow}(t) = \omega \left[ \frac{1}{|S(t)|} \sum_{i \in S(t)} v_i(t) \right] + (1-\omega) v_{max}$$

In some embodiments, the flow velocity, $v_{flow}(t)$, may be based on the average traffic velocity $v_{avg}(t)$ and be given by:

$$v_{flow}(t) = \omega[v_{avg}(t)] + (1-\omega) v_{max}$$

In this manner, the position disruption value, $d_{x_H}$, of the proximate vehicle 118 is indicative of the difference between the observed position of the proximate vehicle 118 at the second time, $t_1$, relative to predicted position that the proximate vehicle 118 would occupy at the second time, $t_1$, if the proximate vehicle 118 were traveling at the constant flow velocity, $v_{flow}(t)$, which may be given by the average traffic velocity $v_{avg}(t)$.

Thus, the disruption module 316 may calculate the total disruption value $D_H(t)$, of the proximate vehicle 118 as:

$$D_H(t) = \gamma_x d_{x_H}(t) + \gamma_v d_{v_H}(t)$$

In some embodiments, the total disruption value may be calculated over a number of iterations to account for changes in the behavior of the proximate vehicle 118 over a time horizon. For example, the disruption module 316 may calculate a first total disruption value of the proximate vehicle 118 for a first iteration from the first time, $t_0$, to the second time, $t_1$, such that to $+T=t_1$. The disruption module 316 may further calculate a second total disruption value of the proximate vehicle 118 for a second iteration from the second time, $t_1$, to a third time, $t_2$, such that $t_1+T=t_2$. Thus, the total disruption of the proximate vehicle 118 may be calculated as:

$$\Delta_H = \frac{1}{T} \int_{t_0}^{t_0+T} D_H(t)\, dt$$

The motion parameters (e.g., position, velocity, acceleration, etc.) of the roadway vehicles 108-120 including both the swarm vehicles 108-116 and the proximate vehicles 118, 120 may be calculated based on the vehicle systems 304, such as the navigation system 336, and/or the sensor data from the vehicle sensors 306. The motion parameters may also be received from the remote server 326 via the communication interface 334. For example, the remote server 326 may receive sensor data, as the remote data 332, or the motion parameters from roadside equipment. The remote processor 328 may calculate the motion parameters and/or the motion parameters may be stored in the remote memory 330.

At block 404, the method 400 includes the social value module 318 determining a proximate social alignment value of the proximate vehicle 118 based on a comparison of the total disruption value to a threshold disruption value, $D_{TH}$. The social value module 318 may determine the proximate social alignment value of the proximate vehicle 118 based on a single iteration, such that the threshold disruption value, $D_{TH}$ is compared to the total disruption value, $D_H(t)$. In another embodiment, the social value module 318 may determine the proximate social alignment value of the proximate vehicle 118 based on multiple iterations, such that the threshold disruption value, $D_{TH}$ is compared to $\Delta_H$ over the time horizon.

The proximate social alignment value is calculated to result in a binary allocation of the proximate vehicle 118 as exhibiting either an egotistic social alignment value or altruistic social alignment value based on an inequality. For example, if the proximate vehicle 118 has an altruistic social alignment value, the proximate vehicle 118 may be more likely to accept a swarm request. Accordingly, the proximate vehicle 118 is considered to have an altruistic social alignment value when the inequality $\Delta_H \leq D_{TH}$ is satisfied. Conversely, if the proximate vehicles 118, 120 are acting altruistically, traffic flow of the roadway 100 may be benefited by having the swarm vehicles 108-116 act egoistically. For example, if the proximate vehicles 118, 120 act egotistically they may move past the swarm vehicles 108-116, thereby reducing the number of vehicles around the swarm. Accordingly, the desired social alignment value may be an egotistic social alignment value. Thus, the inequality that the proximate vehicle 118 is to satisfy if the desired social alignment value is an egotistic social alignment value is $\Delta H \geq D_{TH}$. Alternatively, if a proximate vehicle 118, 120 has a higher disruption than the threshold it may mean that the proximate vehicle 118, 120 is either going too fast (very aggressive/egoistic driver who may not cooperate with other swarm members) or too slow (a physically slow vehicle like a truck on the slow-lane would not be either a reasonable vehicle to include in swarm), therefore, an egotistic vehicle may not be included in the swarm.

In another embodiment, the threshold disruption value, $D_{TH}$ may be based on a desired social alignment value of the swarm. For example, in a region where aggressive driving is typical, the general flow of all of the traffic on the roadway 100 may be best served by operating the swarm in an altruistic manner because if both the swarm vehicles 108-116 and the proximate vehicles 118, 120 are acting egotistically, a traffic jam may be more likely to occur. Thus, in such a scenario, the desired social alignment value may be an altruistic social alignment value that satisfies the inequality $\Delta H \leq D_{TH}$. If the total disruption value of the proximate vehicle 118 does satisfy the inequality, the proximate vehicle 118 satisfies the desired social alignment value. If the inequality is not satisfied, the proximate vehicle 118 does not satisfy the desired social alignment value.

Therefore, based on the inequality, the desired social alignment value may be either an altruistic social alignment value or an egotistic social alignment value based on the disruptive behavior exhibited by the proximate vehicle 118, 120. exhibiting an egotistic social alignment value or an altruistic social alignment value. The desired social alignment value may be selected such that the proximate social alignment value of the proximate vehicle matches the chosen social alignment value of the swarm. For example, if a swarm vehicle is behaving altruistically, the desired social alignment value may be an altruistic social alignment value.

As discussed above, the calculations may be iterative. Accordingly, the social value module 318 may determine a first proximate social alignment value that does not correspond to the desired social alignment value. For example, the total disruption value exceeds the threshold disruption value, such that the proximate vehicle 118 is determined to have an egotistical social alignment value, when an altruistic social alignment value is desired. In a next iteration, the behavior of the proximate vehicle 118 may change. Here, the total disruption value of the proximate vehicle may be less the threshold disruption value. Consequently, the social value module 318 may determine a second proximate social alignment value that is determined to be an altruistic social alignment value, which is the desired social alignment value. In some embodiments, the proximate vehicle 118 may need to have the same social alignment value over a predetermined number of iterations for the social value module 318 to determine a proximate social alignment value.

At block 406, the method 400 includes the invitation module 320 sending a swarm request to the proximate vehicle 118 when the proximate social alignment value corresponds to the desired social alignment value. The invitation module 320 may utilize a transceiver (not shown), a wireless network antenna (not shown), roadside equipment, the network 324 (e.g., a wireless communication network), or other wireless network connections to send the swarm request to the proximate vehicle 118. Thus, one or more of the swarm vehicles 108-116 may send an invitation to a proximate vehicle based, at least partially, on a desired social alignment value of the proximate vehicle 118, 120. The desired social alignment value may be an altruistic social alignment value in order to increase the likelihood that the proximate vehicle 118, 120 will accept the invitation.

The swarm request may include vehicle identifiers for one or more of the swarm vehicles 108-116. A vehicle identifier may include a unique identifier that allows the proximate vehicle 118 to identify a swarm vehicle of the swarm. For example, the vehicle identifier may include location information that indicates a global position of the swarm vehicles 108-116 so that the proximate vehicle 118 is able to identify the swarm vehicles 108-116. A swarm request may also include a cooperating proposal. The cooperating proposal may form a basis for sharing autonomy. For example, the cooperating proposal may include a destination, planned route, specific cooperating parameters, the shared goal, etc.

In some embodiment, the invitation module 320 may receive an acceptance message to join the swarm. In response to receiving the acceptance message, the cooperation module 322 may add the proximate vehicle 118 to the swarm.

Accordingly, the cooperation module 322 may provide the proximate vehicle 118 with shared autonomy, prescribed actions, coordinates, and/or facilitates sharing of autonomy between the proximate vehicle 118 and one or more of the swarm vehicles 108-116. For example, a swarm vehicle may share sensor data, decision-making capability, behavior plans, actions, etc. In this manner, the cooperation module 322 may cause the proximate vehicle to act as a swarm vehicle of the swarm.

Figure 5:
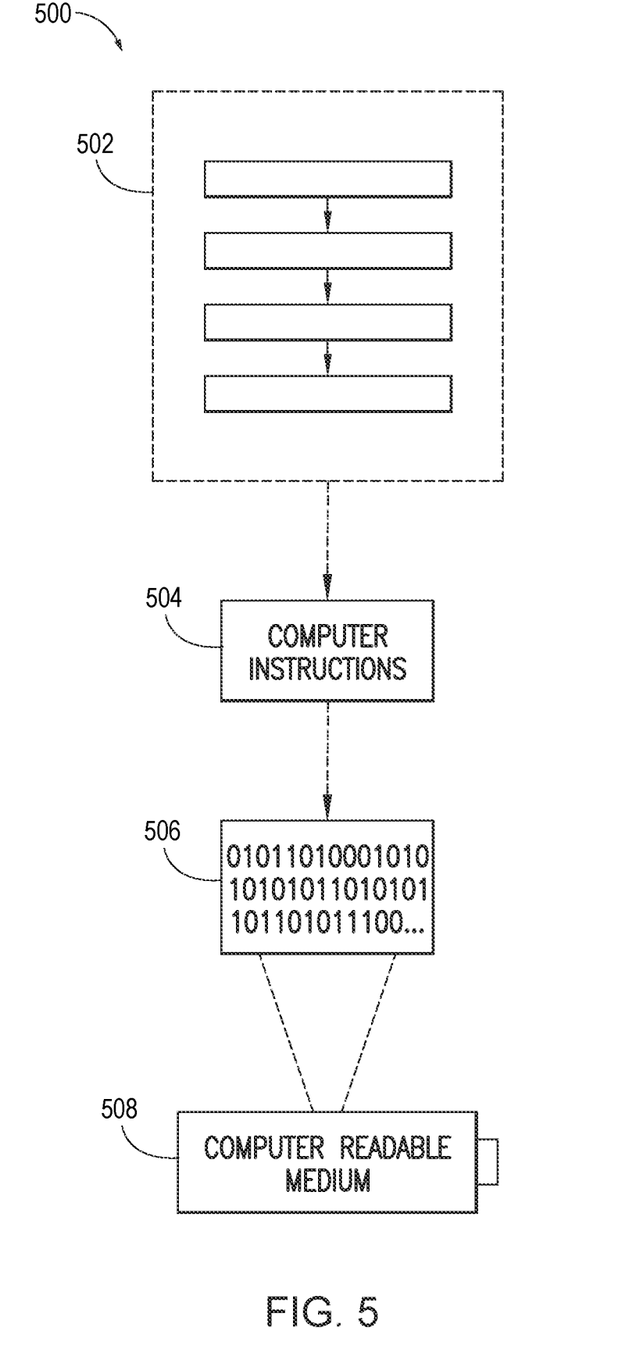
FIG. 5 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 5, wherein an implementation 500 includes a computer-readable medium 508, such as a CD-R, DVD-R, flash drive, a platter of a hard disk drive, etc., on which is encoded computer-readable data 506. This encoded computer-readable data 506, such as binary data including a plurality of zero's and one's as shown in 506, in turn includes a set of processor-executable computer instructions 504 configured to operate according to one or more of the principles set forth herein. In this implementation 500, the processor-executable computer instructions 504 may be configured to perform a method 502, such as the method 400 of FIG. 4. In another aspect, the processor-executable computer instructions 504 may be configured to implement a system, such as the operating environment 300 of FIG. 3. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for swarm invitation based on social values, comprising:
    a processor; and
    a memory storing instructions that when executed by the processor cause the processor to:
        calculate a total disruption value of a proximate vehicle on a roadway with a plurality of swarm vehicles of a swarm on the roadway, wherein the proximate vehicle and the swarm vehicles of the swarm are roadway vehicles traveling in the same longitudinal direction on the roadway, wherein the total disruption value of the proximate vehicle is based on a velocity disruption value of the proximate vehicle and a position disruption value of the proximate vehicle, and wherein the velocity disruption value is based on a velocity differential between a proximate vehicle velocity and traffic velocity that is an average velocity of the roadway vehicles;
        determine a proximate social alignment value of the proximate vehicle based on a comparison of the total disruption value to a threshold disruption value, wherein the threshold disruption value is based on a desired social alignment value of the swarm; and
        send a swarm request to the proximate vehicle when the proximate social alignment value corresponds to the desired social alignment value.

2. The system of claim 1, wherein the position disruption value is based on a position differential of the proximate vehicle from in a first iteration from a first time to a second time, wherein the position differential is based on an observed position of the proximate vehicle at the second time relative to an expected position of the proximate vehicle at the second time in a predicted trajectory based on a flow velocity of the roadway vehicles.

3. The system of claim 1, wherein the total disruption value of the proximate vehicle is a first total disruption value that corresponds to a first iteration, and the instructions further cause the processor to calculate a second total disruption value for a second iteration, from a second time to a third time.

4. The system of claim 3, wherein the proximate social alignment value is a first proximate social alignment value that does not correspond to the desired social alignment value, wherein the instructions further cause the processor to determine a second proximate social alignment value based on the second total disruption value.

5. The system of claim 4, wherein the second proximate social alignment value corresponds to the desired social alignment value.

6. The system of claim 1, wherein the proximate social alignment value calculated to result in a binary allocation of the proximate vehicle as exhibiting an egotistic social alignment value or an altruistic social alignment value.

7. The system of claim 1, wherein the position disruption value is based on a position differential of the proximate vehicle from a first iteration from a first time to a second time, wherein the position differential is based on an observed position of the proximate vehicle at the second time relative to an expected position of the proximate vehicle at the second time in a predicted trajectory based on a flow velocity of the roadway vehicles, and wherein the proximate social alignment value is a first proximate social alignment value that does not correspond to the desired social alignment value, and wherein the processor is further caused to determine a second proximate social alignment value based on a second total disruption value, wherein the second proximate social alignment value corresponds to the desired social alignment value.

8. A computer-implemented method for swarm invitation based on social values, comprising:
    calculating a total disruption value of a proximate vehicle on a roadway with a plurality of swarm vehicles of a swarm on the roadway, wherein the proximate vehicle and the swarm vehicles of the swarm are roadway vehicles traveling in the same longitudinal direction on the roadway, wherein the total disruption value of the proximate vehicle is based on a velocity disruption value of the proximate vehicle and a position disruption value of the proximate vehicle, and wherein the velocity disruption value is based on a velocity differential between a proximate vehicle velocity and traffic velocity that is an average velocity of the roadway vehicles;

determining a proximate social alignment value of the proximate vehicle based on a comparison of the total disruption value to a threshold disruption value, wherein the threshold disruption value is based on a desired social alignment value of the swarm; and sending a swarm request to the proximate vehicle when the proximate social alignment value corresponding to the desired social alignment value.

9. The computer-implemented method of claim 8, wherein the position disruption value is based on a position differential of the proximate vehicle from in a first iteration from a first time to a second time, wherein the position differential is based on an observed position of the proximate vehicle at the second time relative to an expected position of the proximate vehicle at the second time in a predicted trajectory based on a flow velocity of the roadway vehicles.

10. The computer-implemented method of claim 8, wherein the total disruption value of the proximate vehicle is a first total disruption value that corresponds to a first iteration, and wherein the computer-implemented method further comprises:

calculating a second total disruption value for a second iteration, from a second time to a third time.

11. The computer-implemented method of claim 10, wherein the proximate social alignment value is a first proximate social alignment value that does not correspond to the desired social alignment value, wherein the computer-implemented method further comprises:

determining a second proximate social alignment value based on the second total disruption value.

12. The computer-implemented method of claim 11, wherein the second proximate social alignment value corresponds to the desired social alignment value.

13. The computer-implemented method of claim 8, wherein the proximate social alignment value calculated to result in a binary allocation of the proximate vehicle as exhibiting an egotistic social alignment value or an altruistic social alignment value.

14. The computer-implemented method of claim 8, wherein the position disruption value is based on a position differential of the proximate vehicle from a first iteration from a first time to a second time, wherein the position differential is based on an observed position of the proximate vehicle at the second time relative to an expected position of the proximate vehicle at the second time in a predicted trajectory based on a flow velocity of the roadway vehicles, and wherein the proximate social alignment value calculated to result in a binary allocation of the proximate vehicle as exhibiting an egotistic social alignment value or an altruistic social alignment value.

15. A non-transitory computer readable storage medium storing instructions that when executed by a computer having a processor perform a method for swarm invitation based on social values, the method comprising:

calculating a total disruption value of a proximate vehicle on a roadway with a plurality of swarm vehicles of a swarm on the roadway, wherein the proximate vehicle and the swarm vehicles of the swarm are roadway vehicles traveling in the same longitudinal direction on the roadway, wherein the total disruption value of the proximate vehicle is based on a velocity disruption value of the proximate vehicle and a position disruption value of the proximate vehicle, and wherein the velocity disruption value is based on a velocity differential between a proximate vehicle velocity and traffic velocity that is an average velocity of the roadway vehicles;

determining a proximate social alignment value of the proximate vehicle based on a comparison of the total disruption value to a threshold disruption value, wherein the threshold disruption value is based on a desired social alignment value of the swarm; and sending a swarm request to the proximate vehicle when the proximate social alignment value corresponding to the desired social alignment value.

16. The non-transitory computer readable storage medium of claim 15, wherein the position disruption value is based on a position differential of the proximate vehicle from in a first iteration from a first time to a second time, wherein the position differential is based on an observed position of the proximate vehicle at the second time relative to an expected position of the proximate vehicle at the second time in a predicted trajectory based on a flow velocity of the roadway vehicles.

17. The non-transitory computer readable storage medium of claim 2, wherein the proximate social alignment value calculated to result in a binary allocation of the proximate vehicle as exhibiting an egotistic social alignment value or an altruistic social alignment value.

18. The non-transitory computer readable storage medium of claim 15, wherein the total disruption value of the proximate vehicle is a first total disruption value that corresponds to a first iteration, and wherein the method further comprises:

calculating a second total disruption value for a second iteration, from a second time to a third time.

19. The non-transitory computer readable storage medium of claim 18, wherein the proximate social alignment value is a first proximate social alignment value that does not correspond to the desired social alignment value, wherein the method further comprises:

determining a second proximate social alignment value based on the second total disruption value, wherein the second proximate social alignment value corresponds to the desired social alignment value.

20. The non-transitory computer readable storage medium of claim 15, wherein the position disruption value is based on a position differential of the proximate vehicle from a first iteration from a first time to a second time, wherein the position differential is based on an observed position of the proximate vehicle at the second time relative to an expected position of the proximate vehicle at the second time in a predicted trajectory based on a flow velocity of the roadway vehicles, and wherein the method further comprises determining a second proximate social alignment value based on a second total disruption value, wherein the second proximate social alignment value corresponds to the desired social alignment value.

* * * * *